(12) United States Patent
 Mohedas (10) Patent No.: US 9,011,696 B2
(45) Date of Patent: *Apr. 21, 2015

(54) MAGNETIC SEPARATION COMBINED WITH DYNAMIC SETTLING FOR FISCHER-TROPSCH PROCESSES

(71) Applicant: RES USA LLC, Westminster, CO (US)

(72) Inventor: Sergio Mohedas, Houston, TX (US)

(73) Assignee: RES USA LLC, Westminster, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/481,800

(22) Filed: Sep. 9, 2014

(65) Prior Publication Data

US 2014/0374359 A1 Dec. 25, 2014

Related U.S. Application Data

(63) Continuation of application No. 12/206,438, filed on Sep. 8, 2008.

(60) Provisional application No. 60/971,093, filed on Sep. 10, 2007.

(51) Int. Cl.
 *B01D 21/02* (2006.01)
 *B03C 1/30* (2006.01)
 (Continued)

(52) U.S. Cl.
 CPC ............... *B03C 1/02* (2013.01); *B01D 21/0045* (2013.01); *B01D 21/0009* (2013.01); *B01J 8/005* (2013.01);
 (Continued)

(58) Field of Classification Search
 CPC .......... B03C 1/02; B03C 1/286; B03C 1/288; B03C 1/30; B03C 2201/18; B01D 21/0009; B01D 21/0045; B01J 8/005; B01J 8/228
 See application file for complete search history.

(56) References Cited

U.S. PATENT DOCUMENTS 2,906,704 A 9/1959 Draeger et al.
3,817,458 A 6/1974 Gilberto et al.
(Continued)

FOREIGN PATENT DOCUMENTS

CN 2404872 11/2000
CN 1697784 11/2005
(Continued)

OTHER PUBLICATIONS

Chinese Office Action dated Mar. 5, 2013 for corresponding Chinese Application No. 200880113459.5 (10 pgs.).
(Continued)

*Primary Examiner* — David C Mellon
(74) *Attorney, Agent, or Firm* — Timothy S. Westby; Porter Hedges LLP (57) ABSTRACT

A system for separating particulate from a fluid stream having an inlet solids content, the system comprising: a magnetic dynamic settling vessel comprising at least one magnetic field inside the vessel and/or one magnetized component; at least one inlet for introduction of the fluid stream having a starting solids content; at least one exit for a stream comprising a solids content not greater than the inlet solids content; at least one exit for a fluid stream comprising a solids content not less than the inlet solids content; and a vertical feed conduit extending at least 70% of the distance from the at least one fluid inlet to the at least one exit for a fluid stream comprising a solids content not less than the inlet solids content. A method for separating particulate from a fluid stream having an inlet solids content is also provided.

15 Claims, 2 Drawing Sheets

(51) Int. Cl.
  *B01J 8/00* (2006.01)
  *B01J 8/22* (2006.01)
  *B03C 1/28* (2006.01)
  *B03C 1/02* (2006.01)
  *B01D 21/00* (2006.01)

(52) U.S. Cl.
  CPC ............... *B01J 8/228* (2013.01); *B03C 1/286* (2013.01); *B03C 1/288* (2013.01); *B03C 1/30* (2013.01); *B03C 2201/18* (2013.01)

(56) References Cited

U.S. PATENT DOCUMENTS

| | | | |
|---|---|---|---|
| 3,844,943 | A | 10/1974 | Duval et al. |
| 4,306,970 | A | 12/1981 | Tanaka et al. |
| 4,502,958 | A | 3/1985 | Sasaki |
| 4,529,517 | A | 7/1985 | Carlvret |
| 4,605,678 | A | 8/1986 | Brennan et al. |
| 5,827,903 | A | 10/1998 | White et al. |
| 6,022,406 | A | 2/2000 | Roux et al. |
| 6,068,760 | A | 5/2000 | Benham et al. |
| 6,712,982 | B2 | 3/2004 | Bohn et al. |
| 6,730,221 | B2 | 5/2004 | Bohn et al. |
| 6,833,078 | B2 | 12/2004 | Espinoza et al. |
| 6,929,754 | B2 | 8/2005 | Espinoza et al. |
| 7,078,439 | B2 | 7/2006 | Odueyungbo et al. |
| 7,360,657 | B2 | 4/2008 | Oder et al. |
| 7,909,990 | B2 | 3/2011 | Takahashi et al. |
| 2003/0183580 | A1 | 10/2003 | Schaaf et al. |
| 2005/0035030 | A1 | 2/2005 | Oder et al. |
| 2006/0111232 | A1 | 5/2006 | Spena et al. |
| 2007/0056912 | A1 | 3/2007 | Oder et al. |
| 2008/0290038 | A1 | 11/2008 | Kaitting et al. |
| 2009/0062108 | A1 | 3/2009 | Demirel et al. |
| 2009/0078650 | A1 | 3/2009 | Kopmeier |
| 2010/0200511 | A1 | 8/2010 | Oder et al. |

FOREIGN PATENT DOCUMENTS

| | | |
|---|---|---|
| DE | 102005053151 | 5/2007 |
| FR | 2766390 | 1/1999 |
| JP | 54154873 | 12/1979 |
| JP | 04171085 | 6/1992 |
| JP | 09313826 | 12/1997 |
| WO | 2005035131 | 4/2005 |

OTHER PUBLICATIONS

Notice of Allowance dated Feb. 22, 2013 for corresponding Australian Application No. 2008299106 (4 pgs.).
Notice of Allowance dated Jan. 21, 2013 for corresponding Canadian Application No. 2,699,780 (1 pg.).
India Examination Report dated Feb. 25, 2014 for corresponding India Application No. 2301/delnp/2010 (3 pgs.).
Office Action dated Jul. 10, 2014 for corresponding U.S. Appl. No. 12/206,438 (10 pgs.).
Search Report and Written Opinion dated Apr. 16, 2009 for corresponding International Application No. PCT/US2008/075707 (11 pgs.).
Office Action dated Apr. 15, 2011 for corresponding U.S. Appl. No. 12/206,438 (11 pgs.).
Office Action dated Jul. 28, 2011 for corresponding U.S. Appl. No. 12/206,438 (10 pgs.).
Office Action dated Jun. 20, 2012 for corresponding U.S. Appl. No. 12/206,438 (12 pgs.).
Office Action dated Aug. 14, 2012 for corresponding U.S. Appl. No. 12/206,438 (11 pgs.).
Office Action dated Oct. 10, 2013 for corresponding U.S. Appl. No. 12/206,438 (11 pgs.).
Office Action dated Dec. 24, 2013 for corresponding U.S. Appl. No. 12/206,438 (21 pgs.).
Office Action dated Apr. 1, 2014 for corresponding U.S. Appl. No. 12/206,438 (11 pgs.).
Canadian Office Action dated Apr. 12, 2012 for corresponding Canadian Application No. 2,699,780 (5 pgs.).
Chinese Office Action dated May 24, 2012 for corresponding Chinese Application No. 200880113459.5 (12 pgs.).
Chinese Office Action dated Nov. 22, 2011 for corresponding Chinese Application No. 200880113459.5 (16 pgs.).
R. R. Oder, "Magnetic Separation of Iron Catalysts from Fischer-Tropsch Wax," Proceedings of the Petroleum Chemistry Division, ACS Annual Meeting, CA dated Mar. 28-Apr. 1, 2004 (2 pgs.).
R. R. Oder et al., "Separation of Iron Catalysts from Fischer-Tropsch Wax," Twentieth Annual Pittsburgh Coal Conference: Coal, Energy and the Environment, Pittsburgh, PA dated Sep. 15-19, 2003 (* pgs.).
International Application No. PCT/US2009/060422 International Search Report dated May 28, 2010, 10 pages.
European Search Report dated Mar. 21, 2012 for corresponding European Application No. 08830023.1 (8 pgs.).
Australian Examination Report dated Apr. 20, 2012 for corresponding Australian Application No. 2008299106 (2 pgs.
Canadian Office Action dated Jul. 12, 2011 for corresponding Canadian Application No. 2,699,780 (2 pgs.).
International Preliminary Report on Patentability dated Mar. 25, 2010 corresponding International Application No. PCT/US2008/075707 (7 pgs.).
European Examination Report dated Oct. 9, 2014 for corresponding European Application No. 08 830 023.1 (6 pgs.).
Notice of Allowance dated Sep. 18, 2014 for corresponding U.S. Appl. No. 12/206,438 (5 pgs.).

MAGNETIC SEPARATION COMBINED WITH DYNAMIC SETTLING FOR FISCHER-TROPSCH PROCESSES

CROSS-REFERENCE TO RELATED APPLICATIONS

This application is a continuation of U.S. patent application Ser. No. 12/206,438, filed Sep. 8, 2008, which claims the benefit under 35 U.S.C. §119(e) of U.S. Provisional Patent Application No. 60/971,093 entitled "Magnetic Separation Combined with Dynamic Settling for Fischer-Tropsch Processes," filed Sep. 10, 2007, the disclosure of each of which is hereby incorporated herein by reference.

STATEMENT REGARDING FEDERALLY SPONSORED RESEARCH OR DEVELOPMENT

Not Applicable.

BACKGROUND OF THE INVENTION

1. Field of the Invention

The present invention relates generally to the separation of liquids from solid particles contained in a multi-phase reactor effluent. More specifically, the present invention relates to a system and method for separating liquid from catalyst particles used to catalyze reactions. Still more specifically, the present invention relates to a reliable and efficient means to separate liquid from solid particles having magnetic properties.

2. Description of the Related Art

Separation of liquid from solid catalyst material used in multi-phase reactors is of paramount importance to many processes and has been intensely studied. For example, the catalyst-liquid separation is one of the most critical steps in the application of slurry type reactors for Fischer-Tropsch (hereinafter FT) processes. Only if this separation is effective is the application of such reactors successful. Separation techniques typically include settling and filtration. Additionally, combinations thereof have been proposed. Magnetic separation as a stand alone process has been proposed.

Cross-flow filtration is a commonly used method. Mild cross flow filtration has been proposed, and this method claims the cake of catalyst particles formed on the surface of filter media acts as the primary barrier to prevent solids from passing through the filter media thus contaminating the liquid. For example, U.S. Pat. No. 6,929,754 discloses a solid/liquid separation system and method for removing wax products from a slurry used in a Fischer-Tropsch reactor. The preferred embodiments of U.S. Pat. No. 6,929,754 are characterized by a solid/liquid separation system that removes liquid products from a slurry by drawing the fluid across a filter medium composed of a filter cake disposed on a substrate. In the preferred embodiments, the filter cake is desirable and performs the majority of the filtration.

The primary disadvantage of filtration methods is that the filter media is prone to clogging, or plugging by small particles resulting from physical and chemical attrition of the catalyst during use. Filtration media are designed for a certain micrometer rating, say 20 micrometers, so that any particles larger than 20 micrometers will be retained on the surface of the media. Particles smaller than 20 micrometers will travel through the media and may exit or get stuck within the pores of the filter medium due to agglomeration, shape, and other factors. Although a backwash method may be used to unplug the medium, with time on stream, backwash may become less effective and eventually the filter elements must be removed from the system and replaced. Fischer-Tropsch catalysts, typically iron-based or cobalt-based, are prone to attrition. Typical fresh catalyst particles are in the range of from 20 micrometers to 100 micrometers. Attrition leads to the formation of particles less than 20 micrometers in size, with some particles in the sub-micron size range. These smaller particles may either clog or plug the filter media, or change the cake composition in such a way that the filter media becomes impermeable and compacted. Compact cakes cause the need for higher pressure drop across the media to get the same volume of liquid across the filter. This leads to a vicious cycle of higher pressure drop leading to an even more compacted cake and/or media plugging which will render the system ineffective.

Settling is another method proposed to separate solid material from liquids in FT processes and other multi-phase reactor systems. Typical settlers are of two types: vertical settlers and inclined settlers (also known as lamellar settlers). U.S. Pat. No. 6,833,078 discloses a solid/liquid separation system and methods for separating liquid products from catalyst fines from a slurry used in a Fischer-Tropsch reactor. A settling system continuously or intermittently removes catalyst fines from the slurry and is coupled with catalyst/liquid separation system that separates liquid products from the slurry.

U.S. Pat. No. 6,068,760 discloses a catalyst/wax separation device for slurry Fischer-Tropsch reactor whereby catalyst particles are separated from the wax in a Fischer-Tropsch reactor by feeding a portion of the reactor slurry to a dynamic settler which does not require any pump. As the slurry flows down a pipe in the center of the settler, the slurry flows into the surrounding annular region at the bottom of the settler. The heavier catalyst particles settle down and are removed as the slurry at the bottom of the settler is recycled back to the reactor. The wax rises up in the annular section and this clarified wax is removed by a wax outlet pipe.

In U.S. Pat. No. 6,730,221, Bohn et al. describe a method whereby catalyst particles are separated from the wax in a slurry reactor by feeding a portion of the slurry to a dynamic settler. Heavier catalyst particles settle and are removed as the slurry at the bottom of the settler is recycled back to the reactor. Clarified wax is removed at the top of the settler. A multi-channel baffle prevents turbulence, improving retention of the desired heavier catalyst particles.

The design of dynamic inclined settlers is such that they allow higher liquid removal rates than similarly sized vertical settlers. In U.S. Pat. No. 7,078,439, Odueyungbo, et al. Jul. 18, 2006 disclose systems and methods for catalyst/hydrocarbon product separation from a FT product slurry. The preferred embodiments in U.S. Pat. No. 7,078,439 are characterized by a separation system that uses a sedimentation chamber, which contains at least one inclined channel that enhances the settling of particles within the slurry. The inclined channel may be provided by a structure selected from the group consisting of tube, pipe, conduit, sheets, trays, walls, plates, and combinations thereof.

In settlers, liquid is typically withdrawn from the top section of the settler. The particle settling and removal rates are dependent on particle settling velocity, which is dependent on particle diameter. The design of settlers is to remove a specified range of particle sizes or larger. Particles in the liquid change size due to attrition over time, as they decrease in size, they leave the settler with the liquid withdrawn, thus contaminating the liquid. This renders the settler which is designed for a particular range of solid particles ineffective. In a FT process, any time catalyst particles leave the reactor, it not only contaminates the liquid product, but decreases the catalyst inventory in the reactor; both may be detrimental for the process economics. Another problem with settlers is that mixing due to convective flow may occur within the settler, lifting particles upward and contaminating the overflow (i.e. the liquid withdrawn from the top section of the vessel).

Reduction of solid catalyst particle size with time in a multiphase reactor or slurry bubble column reactor (due to physical and/or chemical attrition) causes a settler with a certain particle size removal to become ineffective. At near constant operating conditions (e.g. pressure, temperature, liquid composition, etc.), a settler can be designed to remove a certain amount of liquids allowing for the solids to settle and follow the slurry path (underflow of the settler) to get a liquid as the overflow of the settler almost free of solid particles. This design works provided the minimum size of the particles for which the settler was designed remains constant. If the minimum size starts to shift to smaller particles, complete separation of solid particles will not occur and some particles will leave with the liquid in the overflow of the settler.

Magnetic separation has been proposed as a stand alone system to separate solids and liquids in FT reactor systems. This system consists of passing the slurry containing liquids and solids to be separated through a vessel with magnetized walls. The solids with magnetic properties will accumulate on or near the walls or along magnetic fields created inside the settler vessel, fall vertically to the bottom of the vessel, and continue to travel in the direction of the slurry stream. Thus the solids can be separated from the liquids which can be withdrawn from the top of the vessel. This technique has been shown to be effective for the removal of solid particulates on the small micron to sub-micron scale range.

Accordingly, a need exists for an efficient and reliable system and method for separating solid catalyst particles from a slurry. The system and method should desirably continue functioning even when minimum particle size shifts to smaller particle size due to catalyst attrition.

SUMMARY

Herein disclosed is a system for separating solid particles from a fluid stream having an inlet solids content, the system comprising: a magnetic dynamic settling vessel comprising at least one magnetic field within the vessel, at least one fluid inlet for introduction of the fluid stream having a starting solids content, at least one exit for a fluid stream comprising a solids content not greater than the inlet solids content, at least one exit for a fluid stream comprising a solids content not less than the inlet solids content, and a vertical feed conduit extending at least 70% of the distance from the at least one fluid inlet to the at least one exit for a fluid stream comprising a solids content not less than the inlet solids content. The vertical feed conduit may extend at least 80% of the distance from the at least one fluid inlet to the at least one exit for a fluid stream comprising a solids content not less than the inlet solids content. In embodiments, the at least one magnetic field is provided by at least one magnetic component. The at least one magnetized component may be selected from the group consisting of at least a portion of the external walls of the magnetic dynamic settling vessel, at least a portion of the internal walls of the settling vessel, magnetic baffles, magnetic fins, magnetic rods, magnetic plates, another magnetized internal component, and combinations thereof. In some embodiments, the at least one magnetized component comprises at least a portion of the walls of the magnetic dynamic settling vessel. In embodiments, the at least one magnetized component is an internal component.

In some embodiments, the magnetic dynamic settling vessel comprises an upper portion comprising vertical external walls and a narrower lower portion comprising inclined external walls. In embodiments, at least a portion of the vertical walls, at least a portion of the inclined walls, or at least a portion of both is magnetized. The at least a portion of the vertical walls, at least a portion of the inclined walls, or at least a portion of both may be magnetized by at least one externally positioned magnet.

In embodiments the at least one magnetic field is created within the vessel in the slurry body (slurry volume) without necessarily having a magnetized component within the magnetic dynamic settling vessel. The at least one magnetic field may be throughout the vessel. In preferred embodiments, the at least one magnetic field is within the bottom section of the magnetic dynamic settling vessel.

In embodiments, the system further comprises a second dynamic settler, the second dynamic settler comprising at least one secondary dynamic settler inlet in fluid connection with the at least one exit for a fluid stream comprising a solids content not less than the inlet solids content; at least one secondary dynamic settler concentrated solids exit; and at least one secondary dynamic settler liquid product exit.

The magnetic dynamic settling vessel may be capable of producing an exit fluid stream comprising a solids content not greater than 5000 ppm by weight. In some embodiments, the magnetic dynamic settling vessel is capable of producing an exit fluid stream comprising a solids content not greater than 2500 ppm by weight. In some embodiments of the system, the magnetic dynamic settling vessel is capable of producing an exit fluid stream comprising a solids content not greater than 1000 ppm by weight.

The magnetic dynamic settling vessel may be operable at a liquid linear upward velocity greater than least 15 cm/h. In embodiments, the magnetic dynamic settling vessel is operable at a liquid linear upward velocity greater than 45 cm/h. Alternatively, the magnetic dynamic settling vessel may be operable at a liquid linear upward velocity greater than 90 cm/h.

In embodiments, the magnetic dynamic settling vessel is capable of producing an exit fluid stream comprising a solids content not greater than 5000 ppm by weight at a liquid linear upward velocity of greater than 15 cm/h, greater than 45 cm/h, or greater than 90 cm/h. In embodiments, the magnetic dynamic settling vessel is capable of producing an exit fluid stream comprising a solids content not greater than 2500 ppm by weight at a liquid linear upward velocity of greater than 15 cm/h, greater than 45 cm/h, or greater than 90 cm/h. In embodiments, the magnetic dynamic settling vessel is capable of producing an exit fluid stream comprising a solids content not greater than 1000 ppm by weight at a liquid linear upward velocity of greater than 15 cm/h, greater than 45 cm/h, or greater than 90 cm/h.

The system may further comprise a secondary separation system, the secondary separation system fluidly connected to the at least one exit for a fluid stream comprising a solids content not greater than the inlet solids content; a clarified liquid product exit; and a waste exit. The secondary separation system may comprise an apparatus selected from cross-flow filtration devices, other filtration devices like press filters, sand filters, high gradient magnetic separation devices, electrostatic separators, centrifugal separators, hydro-cyclones (hydro-clones) and combinations thereof. In embodiments, the magnetic dynamic settling vessel is positioned downstream of a multi-phase catalytic reactor comprising catalyst. The catalytic reactor may comprise a Fischer-Tropsch reactor comprising a feedstream inlet, a slurry inlet, a vapor product exit, and a liquid product exit.

In embodiments, the at least one fluid inlet for introduction of the fluid stream having an inlet solids content of the magnetic dynamic settling vessel is in fluid communication with a liquid outlet from a vapor/liquid separator, said vapor/liquid separator located downstream of the multi-phase catalytic reactor, and an inlet of said vapor/liquid separator in fluid communication with a fluid outlet of the multi-phase reactor. In embodiments, the at least one exit for a fluid stream comprising a solids content not less than the inlet solids content is in fluid communication with the slurry inlet of the Fischer-Tropsch reactor. In some embodiments, the at least one secondary dynamic settler concentrated solids exit is in fluid communication with the slurry inlet of a Fischer-Tropsch reactor.

The solid particles may comprise FT catalyst comprising a metal selected from the group consisting of iron, cobalt, and combinations thereof. In embodiments, the catalyst particles have a size in the range of from about 10 microns and about 200 microns. In some embodiments of the system, the majority of the catalyst particles have a size in the range of from about 20 microns and about 150 microns. A small amount (a minority) of the catalyst particles may have a size of less than 10 microns and more than 150 microns, with attrition leading, with time on stream, to smaller particles. In embodiments, a minority of the catalyst particles have a size of less than 10 microns.

Also disclosed herein is a method for separating solid particles from a fluid stream having an inlet solids content, the method comprising: introducing the fluid stream into a magnetic dynamic settler, the magnetic dynamic settler comprising a magnetic field within the vessel, at least one fluid inlet for introduction of the fluid stream having an inlet solids content, at least one exit for a liquid product stream comprising a solids content not greater than the inlet solids content, at least one exit for a fluid stream comprising a solids content not less than the inlet solids content, and a vertical feed conduit extending at least 70% of the distance from the at least one fluid inlet to the at least one exit for a fluid stream comprising a solids content not less than the inlet solids content; removing from the magnetic dynamic settler at least one liquid product stream comprising a solids content not greater than the inlet solids content; and removing from the magnetic dynamic settler at least one stream comprising a solids content not less than the inlet solids content.

The at least one liquid product stream comprising a solids content not greater than the inlet solids content may comprise a solids content not greater than 5000 ppm by weight. In some embodiments, the at least one liquid product stream comprising a solids content not greater than the inlet solids content comprises a solids content not greater than 2500 ppm by weight. In certain embodiments, the at least one liquid product stream comprising a solids content not greater than the inlet solids content comprises a solids content not greater than 1000 ppm by weight.

In embodiments of the method, the magnetic dynamic settler has a liquid linear upward velocity of greater than 15 cm/h. In some embodiments, the magnetic dynamic settler has a liquid linear upward velocity of greater than 45 cm/h. In certain embodiments, the magnetic dynamic settler has a liquid linear upward velocity of greater than 90 cm/h. In embodiments, the method is used to separate solid particles comprising Fischer-Tropsch catalyst particles. The Fischer-Tropsch catalyst particles may comprise at least one metal selected from the group consisting of iron and cobalt. The majority of the catalyst particles may have a particle size in the range of from about 10 microns to about 200 microns when the catalyst is fresh. Alternatively, the majority of the catalyst particles may have a particle size in the range of from about 20 microns to about 150 microns when the catalyst is fresh.

In embodiments of the method, the magnetic field is provided by at least one magnetized component selected from the group consisting of at least a portion of the external walls of the magnetic dynamic settler, at least a portion of the internal walls of the settler, magnetic baffles, magnetic fins, magnetic rods, magnetic plates, another magnetized internal component, and combinations thereof. In some embodiments, the at least one magnetic component comprises at least a portion of the walls of the magnetic dynamic settler. The magnetic dynamic settler may further comprise at least one magnetized internal component. In some embodiments, the magnetic dynamic settler comprises an upper portion comprising vertical external walls and a narrower lower portion comprising inclined external walls. In embodiments, at least a portion of the vertical walls, at least a portion of the inclined walls, or at least a portion of both is magnetized by at least one externally positioned magnet.

The method may further comprise introducing the stream comprising a solids content not less than the inlet solids content into a second dynamic settler. The method may still further comprise removing from the second dynamic settler at least one secondary dynamic settler concentrated slurry stream and at least one secondary dynamic settler liquid product stream. In embodiments, the at least one secondary dynamic settler concentrated slurry stream is introduced into a Fischer-Tropsch reactor.

In embodiments of the method, the liquid product stream comprising a solids content not greater than the inlet solids content is introduced into a secondary separation system. The secondary separation system may comprise an apparatus selected from cross-flow filtration devices, high gradient magnetic separation devices, integrated multi-step solid/liquid separation systems, and combinations thereof.

In some embodiments of the method, the fluid stream having a solids content comprises effluent removed from a multi-phase catalytic reactor, said effluent comprising solid magnetic catalyst particles. In embodiments, the multi-phase catalytic reactor comprises a Fischer-Tropsch reactor. In embodiments, the solid magnetic catalyst particles are selected from iron-based catalyst particles and cobalt-based catalyst particles.

In some embodiments of the method, the method further comprises removing vapor from the effluent via a vapor/liquid separator to produce the fluid stream having an inlet solids content.

In some embodiments, the method further comprises removing at least a portion of the solid particles from the effluent upstream of the magnetic dynamic settler.

In embodiments, the method further comprises introducing the at least one stream comprising a solids content not less than the inlet solids content to a Fischer-Tropsch reactor.

Thus, the present invention comprises a combination of features and advantages which enable it to overcome various problems of prior devices. The various characteristics described above, as well as other features, will be readily apparent to those skilled in the art upon reading the following detailed description of the preferred embodiments of the invention, and by referring to the accompanying drawings.

BRIEF DESCRIPTION OF THE DRAWINGS

For a more detailed description of the preferred embodiment of the present invention, reference will now be made to the accompanying drawings, wherein.

NOTATION AND NOMENCLATURE

Certain terms are used throughout the following descriptions and claims to refer to particular system components. This document does not intend to distinguish between components that differ in name but not function.

In the following discussion and in the claims, the terms "including" and "comprising" are used in an open-ended fashion, and thus should be interpreted to mean "including, but not limited to . . . ".

Use of the terms 'magnetic dynamic settling vessel' and 'magnetic dynamic settler' does not imply that all or even a majority of the settling vessel is magnetic, rather it is used to mean that the settling vessel or dynamic settler comprises at least one magnetic component or the use of magnetic fields inside the settler to enhance the settling process.

The term 'slurry' is used to refer to fluid comprising solid particles.

When a stream is referred to as a 'solids' stream, it is to be understood that the stream comprises liquid as well as solids. The term 'solids' is used to indicate which outlet stream of a vessel comprises a greater quantity of solids, and differentiates it from a 'liquid product' stream, which comprises less, if any, solid material.

DETAILED DESCRIPTION

Overview

Herein disclosed are a system and method for separating solid particles from a fluid stream. The system and method combine magnetic separation and dynamic settling and may be particularly effective for separating solid catalyst particles comprising at least one metal from a fluid stream. The unique combination of magnetic separation with settling may provide a liquid essentially free of solid particles.

Catalysts typically used in FT processes are iron-based and cobalt-based. These catalysts have magnetic properties and become attracted to magnetized surfaces. By applying magnetization to appropriate surfaces of a settler and/or by creating a magnetic field inside the settler vessel, the mixing in the bulk of the liquid will be minimized as the particles will tend to deposit on the surfaces or agglomerate along the magnetic fields rendering the settler much more effective, as agglomerated particles settle at much higher velocities than individual particles allowing for a higher rate of liquid withdrawal and/or enhanced liquid quality (lesser amount of solids in product liquid stream). Also, the smaller particles generated by attrition over time will be most attracted to the magnetized surfaces or may agglomerate along the magnetic fields created inside the settler avoiding liquid overflow contamination. In this way the settler does not become ineffective by the change of particle size distribution over time or, at least, the effects are minimized.

System

The magnetic separation and settling system (hereinafter MSS), which may be positioned downstream of a reactor, may be particularly suitable for use in a Fischer-Tropsch (hereinafter FT) synthesis process. Although the herein disclosed system and method are suitable for solid/liquid separation within many disparate processes involving multi-phase reaction, the following description will be made with reference to the FT reaction. It is to be understood that the present disclosure is equally suitable to other processes wherein the separation of particles comprising a magnetic component from liquids is desired.

Figure 1:
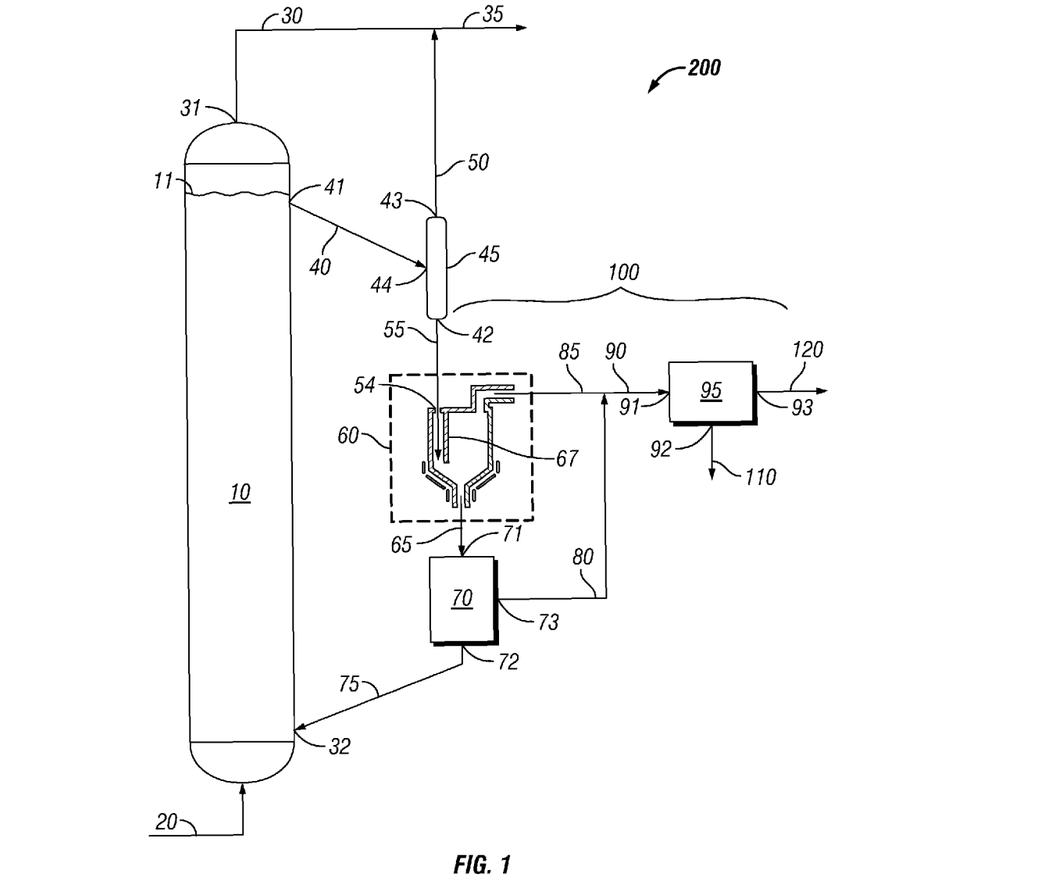
FIG. 1 is a schematic of a Fischer-Tropsch process incorporating a magnetic separation and settling system (MSS) according to an embodiment of the present disclosure.

FIG. 1 illustrates an embodiment of a FT system 200 comprising MSS 100 (magnetic separation and settling system), multi-phase reactor 10, and vapor/liquid-slurry separator 45, which may also be referred to as a slurry degasser, (the liquid exiting the reactor comprises solid catalyst particles, and, therefore is referred to as a slurry). In embodiments, MSS 100 comprises magnetic dynamic settling vessel (hereinafter MDSV) 60. As discussed further hereinbelow, MSS 100 can further comprise optional secondary separation system (hereinafter OSS system) 95. Optionally, MSS 100 comprises dynamic settler (hereinafter DS) 70, as further discussed hereinbelow.

Multi-phase FT synthesis reactor 10 converts a synthesis gas feedstream 20 (synthesis gas is a mixture of carbon monoxide and hydrogen) into liquid hydrocarbons of various forms. Clarified liquid hydrocarbon products 120, from which catalyst has been removed, are recovered from FT system 200. As mentioned hereinabove, typical catalysts used for FT reaction are based on iron or cobalt. FT is commonly used to produce a synthetic petroleum substitute, typically from coal, bio-mass or natural gas, for use as synthetic lubrication oil or as synthetic fuel (mainly diesel, jet fuel and naphtha). In embodiments, reactor 10 comprises a multi-phase reactor.

In embodiments, the catalyst is a FT catalyst comprising at least one metal selected from the group consisting of iron and cobalt. In embodiments, the FT catalyst comprises particles substantially in the range of from about 10 µm to about 200 µm. In some embodiments, the FT catalyst comprises particles substantially in the range of from about 20 µm to about 150 µm. A small amount of catalyst particles may have a size of less than 10 microns or more than 150 microns. Due to physical and/or chemical attrition, smaller particles may be generated as the catalyst is activated and/or with time on line. In embodiments, a minority of the catalyst particles have a size of less than 10 microns.

In embodiments of MSS 100, reactor 10 is a FT synthesis reactor. Reactor 10 comprises FT gas exit 31 and FT liquid exit 41. FT liquid exit 41 and FT gas exit 31 are commonly positioned in the top portion of multi-phase reactor 10, with FT gas exit 31 at or near the top of multi-phase reactor 10 and FT liquid exit 41 at or near the top of liquid slurry 11.

In embodiments, FT system 200 further comprises degasser or vapor/liquid-slurry separator (hereinafter VLS) 45 which may be any vapor/liquid separator known to those of skill in the art. In embodiments, VLS inlet 44 is below the level of reactor liquid exit 41 and the flow is gravity assisted as the density of the slurry within reactor 10 is less than the density of the liquid/slurry column after the vapor/liquid-slurry separator. In embodiments, the flow of effluent from reactor 10 to VLS 45 is pump-assisted. VLS vapor stream 50 exits VLS 45 via VLS gas exit 43. In embodiments, VLS liquid exit 42 is fluidly connected to MDSV slurry inlet 54. Catalyst is removed from FT effluent 40 comprising catalyst slurry to yield clarified liquid hydrocarbon products 120. This separation of solid catalyst particles from liquid hydrocarbon product is performed with MSS 100. Recovered concentrated catalyst slurry may be recycled to reactor 10.

In embodiments, the ratio of MDSV concentrated slurry stream 65 to MDSV liquid product stream 85 is in the range of from about 5 to about 20. Alternatively, the ratio of the flow in MDSV concentrated slurry stream 65 (underflow) to that of MDSV liquid product stream 85 (overflow) is in the range of from 10 to about 20.

MSS 100 comprises magnetic dynamic settling vessel 60 which separates catalyst from liquid wax product via a combination of magnetic fields and/or magnetic components along with dynamic settling. U.S. Pat. Nos. 6,068,760 and 6,730,221, each of which is incorporated herein by reference in its entirety for all purposes, disclose dynamic settling vessels for separating catalyst particles from wax in a Fischer-Tropsch reactor by feeding a portion of the reactor slurry to the dynamic settler. In embodiments, MDSV 60 comprises a dynamic settling vessel as disclosed in U.S. Pat. No. 6,068,760 or 6,730,221 and further comprising a magnetic field for enhancing separation of catalyst particles from the product wax.

Figure 2:
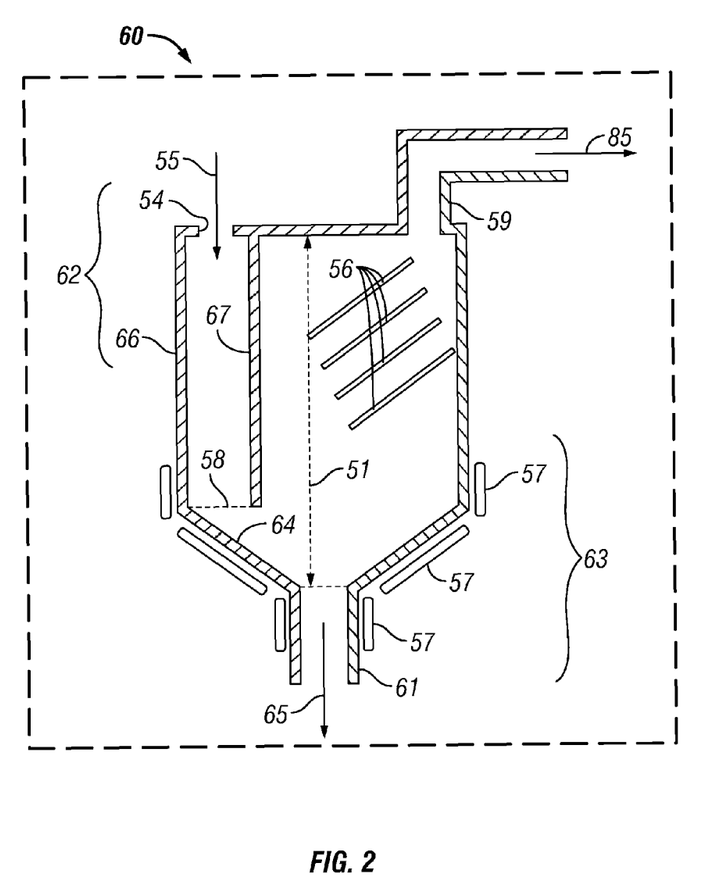
FIG. 2 is a detailed schematic of a magnetic dynamic settling vessel of the MSS system of FIG. 1.

FIG. 2 is a schematic of an embodiment of MDSV 60. In embodiments, MDSV 60 is roughly conically shaped, as shown in the depiction of FIG. 2. In some embodiments, MDSV 60 comprises vertical walls 66 along the top portion 62 and inclined walls 64 within a bottom portion 63. In embodiments, the bottom portion 63 of MDSV 60 is frustoconical.

Magnetic dynamic settling vessel 60 comprises at least one magnetic field therein. Without wishing to be limited by theory, the presence of a magnetic field(s) in MDSV 60 serves to agglomerate the solid particles. The performance of a settling process depends on the settling velocity which is proportional to the particle size. When particles agglomerate, the agglomerated particles behave as larger particles, and settle with a greater settling velocity. The combination of dynamic settling with magnetic separation thus increases the effectiveness of separation of solid particles from the product stream.

In embodiments the at least one magnetic field is created within the vessel in the slurry body (slurry volume) with no magnetized component within the magnetic dynamic settling vessel. The at least one magnetic field may be throughout substantially the entire slurry volume of the MDSV. In preferred embodiments, the at least one magnetic field is throughout substantially the entirety of the bottom section of the slurry volume of the MDSV. The at least one magnetic field preferably comprises at least a portion of the lower 20% of the slurry volume of the MDSV. In some embodiments, the at least magnetic field comprises at least a portion of the lower 50% of the slurry volume of the MDSV. As indicated in the FIG. 1, in embodiments, the magnetic dynamic settling vessel comprises no interior physical component, other than the feed conduit, contains a single interior void volume, and/or contains a vertical feed conduit at one side thereof.

In embodiments, the magnetic field within MDSV 60 is provided by at least one magnetic component selected, but not limited to, magnetic external walls, magnetic internal walls, magnetic internal baffles, magnetic internal fins, magnetic internal rods, magnetic internal plates, another magnetized internal component, and combinations thereof. In embodiments, the at least one magnetized component is an internal component. In embodiments, the at least one magnetized internal component is positioned vertically. In embodiments, at least a portion of the walls of MDSV 60 is magnetized. In embodiments, at least a portion of the lower portion 63 of MDSV 60 is magnetized. In embodiments, MDSV 60 comprises magnetized internal components positioned at an incline. In embodiments, at least a portion of MDSV vertical walls 66 is magnetized. In embodiments, at least a portion of MDSV inclined walls 64 is magnetized.

As mentioned herein, in some embodiments, magnetic dynamic settling vessel 60 comprises magnetized exterior walls. In embodiments, the walls of the settling vessel are magnetized by at least one magnet. In embodiments, at least a portion of the walls of MDSV 60 are magnetized by a plurality of magnets; for example, magnets 57 in FIG. 2. The catalyst particles within MDSV inlet stream 55 having magnetic properties are attracted to the magnetic surfaces of the exterior vessel walls and/or internal components and, thereby, the catalyst particles may be separated from MDSV liquid product stream 85. Magnetic fields can also be created inside the vessel (instead of or in addition to on vessel surfaces) in a way that particles start to agglomerate in the body of the slurry filled vessel, preferably near the bottom of MDSV 60 and near slurry discharge point 58. Magnetic fields may be created such that the particles agglomerate along horizontal planes or vertical planes. In embodiments, MDSV 60 further comprises inclined plates 56. In the embodiment of FIG. 2, MDSV 60 comprises magnetized inclined plates 56. In embodiments, the top section of each plate/rod is magnetized. Liquid flowing parallel to the surfaces has less opportunity to carry solid particles with it as the solids particles not only fall onto the surfaces by settling but separation from the liquid is also enhanced by the attraction of the particles to the magnetic surfaces. In embodiments, MDSV 60 comprises vertical magnetized rods/plates. In embodiments, the MSS 100 comprises more than one MDSV. In embodiments, MSS 100 comprises more than one MDSV 60 with at least a portion of at least one MDSV 60 having magnetized walls.

MDSV 60 comprises at least one MDSV slurry inlet 54. MDSV 60 comprises a feed conduit 67 extending downwardly into a sealed vertical dynamic settler chamber a substantial length. In embodiments, the feed conduit is a vertical feed conduit. In embodiments, the feed conduit 67 extends at least 70% of the length 51 of MDSV 60 such that the slurry discharge point 58 is located in the lower portion 63 of MDSV 60. In embodiments, the feed conduit 67 extends at least 80% of the length 51 of MDSV 60 such that the slurry discharge point 58 is located in the lower portion 63 of MDSV 60. In embodiments, feed conduit 67 extends downwardly to within the conical zone at the bottom of MDSV 60. In embodiments, feed conduit 67 is positioned in the geometric center of MDSV 60. In some embodiments, as shown in FIG. 2, feed conduit 67 is located at one side of MDSV 60 and the vessel further comprises internal plates, such as internal inclined plates 56

MDSV 60 further comprises at least two outlets. MDSV 60 comprises an MDSV liquid product outlet 59 from which liquid product reduced in solids content exits MDSV 60 and MDSV concentrated slurry outlet 61 from which a stream increased in solids content exits MDSV 60. In the embodiment of FIG. 2, liquid product exits MDSV 60 via MDSV liquid product stream 85 which exits MDSV 60 via MDSV liquid product outlet 59. MDSV liquid product outlet 59 is located within an upper portion 62 of MDSV 60. In the embodiments of FIG. 2, concentrated catalyst slurry is removed from MDSV 60 via MDSV concentrated slurry outlet 61 and MDSV concentrated slurry stream 65. Concentrated catalyst slurry is removed from a lower portion 63 of MDSV 60. In some embodiments, MDSV concentrated slurry stream 65, MDSV liquid product stream 85, or both undergo further settling or filtering processes.

As mentioned hereinabove, in embodiments, feed conduit 67 is positioned near the geometric center of MDSV 60 and forms an annular region between the inner walls of the chamber and the feed conduit 67, whereby as the slurry flows into an annular region at the bottom of the settler, the heavier catalyst particles settle down aided by gravity and the magnetic field within MDSV 60 and are removed as the concentrated slurry at the bottom 63 of the settler via concentrated slurry stream 65 and concentrated slurry outlet 61. Nonmagnetic wax product rises up in the annular section and clarified wax is removed by a wax liquid product outlet pipe 59 and MDSV liquid product stream 85. In embodiments, it is envisioned that MDSV 60 comprises a plurality of liquid product outlets. The use of multiple liquid outlets may aid in minimizing/avoiding undesirable preferential liquid flow within the annular region. For example, the use of multiple outlets may be useful in embodiments in which feed conduit 67 is positioned near the geometric center of MDSV 60 and wherein the use of a single outlet positioned off-center would lead to undesirable preferential upward liquid flow.

In embodiments, MDSV 60 further comprises a multichannel baffle as described in U.S. Pat. No. 6,730,221. The baffle(s) may help to prevent turbulence and/or improve retention of solid particles. The multichannel baffle may serve to divide the annular volume into plural channels. In embodiments, the maximum cross-sectional dimension of the channels is sufficiently small that natural convection flow is minimized and particle settling is promoted. In some embodiments, the multichannel baffle is positioned within the annular volume between the vessel walls 66 and the feed conduit 67. In these embodiments, wax liquid product outlet pipe 59 communicates with the annular volume above the multichannel baffle and MDSV concentrated slurry outlet 61 communicates with the annular volume below the multichannel baffle. In embodiments, channels of the multichannel baffle have hexagonal cross section. Alternatively, the channels are circular in cross section.

Without wishing to be limited by theory, combining the eduction formed by the feed conduit 67 extending downwardly to within the conical bottom of MDSV 60 with the agglomeration of the particles due to magnetic field(s) within MDSV 60, leads to increased catalyst separation effectiveness. Effectiveness of catalyst settling/separation is meant to refer to an increase in wax product overflow (increase in quantity) in MDSV liquid product stream 85 for the same size vessel and/or less solid particles within MDSV liquid product stream 85 (increase in quality). The combination of dynamic settling with magnetic separation in a single vessel allows operation at a greater flow rate of MDSV liquid product stream 85 without compromising removal of solid particles from the wax product.

In embodiments, MDSV 60 is capable of reducing the solids content of liquid product stream 85 to less than 5000 ppm. In embodiments, MDSV 60 is capable of reducing the solids content of liquid product stream 85 to less than 2500 ppm. In certain embodiments, MDSV 60 is capable of reducing the solids content of liquid product stream 85 to less than 1000 ppm.

In embodiments, MDSV 60 is capable of reducing the solids content of liquid product stream 85 to less than about 5000 ppm while operating at a liquid linear upward velocity of greater than or equal to 15 cm/h. In embodiments, MDSV 60 is capable of reducing the solids content of liquid product stream 85 to less than about 5000 ppm while operating at a liquid linear upward velocity of greater than or equal to 45 cm/h. In embodiments, MDSV 60 is capable of reducing the solids content of liquid product stream 85 to less than about 5000 ppm while operating at a liquid linear upward velocity of greater than or equal to 90 cm/h.

In embodiments, MDSV 60 is capable of reducing the solids content of liquid product stream 85 to less than about 2500 ppm while operating at a liquid linear upward velocity of greater than or equal to 15 cm/h. In embodiments, MDSV 60 is capable of reducing the solids content of liquid product stream 85 to less than about 2500 ppm while operating at a liquid linear upward velocity of greater than or equal to 45 cm/h. In embodiments, MDSV 60 is capable of reducing the solids content of liquid product stream 85 to less than about 2500 ppm while operating at a liquid linear upward velocity of greater than or equal to 90 cm/h.

In embodiments, MDSV 60 is capable of reducing the solids content of liquid product stream 85 to less than about 1000 ppm while operating at a liquid linear upward velocity of greater than or equal to 15 cm/h. In embodiments, MDSV 60 is capable of reducing the solids content of liquid product stream 85 to less than about 1000 ppm while operating at a liquid linear upward velocity of greater than or equal to 45 cm/h. In embodiments, MDSV 60 is capable of reducing the solids content of liquid product stream 85 to less than about 1000 ppm while operating at a liquid linear upward velocity of greater than or equal to 90 cm/h.

In embodiments, MDSV concentrated slurry stream 65 is recycled to reactor 10. In embodiments, concentrated slurry stream 65 is treated as known to those of skill in the art to further separate liquids therefrom and/or regenerate catalyst prior to recycle to reactor 10. Fischer-Tropsch catalyst may be regenerated by, for example, purging the catalyst with an inert gas or by a regenerating gas for a period of time as known to those of skill in the art.

In the embodiment of FIG. 1, MSS 100 further comprises a second dynamic settler (hereinafter DS) 70 and secondary separation system 95 (both of which are optional components of MSS 100). In embodiments, DS 70 comprises a vertical settler. In some embodiments, DS 70 comprises an inclined settler. DS 70 may comprise an integrated multi-step solid/liquid separation system. DS 70 comprises at least one DS inlet 71 and at least two DS outlets. DS 70 comprises DS liquid product outlet 73 and DS concentrated slurry outlet 72. In embodiments, DS inlet 71 is fluidly connected to MDSV concentrated slurry outlet 61. In embodiments, DS concentrated slurry outlet 72 is fluidly connected to reactor 10 via reactor slurry inlet 32. In embodiments, reactor slurry inlet 32 is positioned in a lower portion of reactor 10. DS 70 may serve to withdraw additional liquids and solid particles of a certain size via DS liquid product stream 80. The solid particles removed via DS liquid product stream 80 may comprise particles of a certain size (usually the smaller sizes) that, due to process requirements, need to be removed from FT system 200. In the embodiment of FIG. 2, MDSV concentrated slurry stream 65 enters DS 70. DS concentrated slurry stream 75 is removed from DS 70 via DS concentrated slurry outlet 72. In embodiments, concentrated slurry returns to reactor 10 via gravity driven loop. In alternative embodiments, concentrated slurry returns to reactor 10 via pump-assisted loop. In embodiments, DS 70 is a MDSV.

In embodiments, FT system 200 further comprises a de-magnetizing device downstream of MDSV 60 whereby magnetized catalyst particles in DS concentrated slurry stream 75 or MDSV concentrated slurry stream 65 are de-magnetized prior to introduction into FT reactor 10. The de-magnetizing device is any device suitable to de-magnetize the catalyst and thus promote homogeneous mixing and/or reduce agglomeration thereof. The de-magnetization device may be a magnet or coil positioned, for example, within a line carrying the catalyst to be recycled to FT reactor 10. In this manner, the magnetization on catalyst particles will be removed and thus will not adversely affect the catalyst behavior in FT reactor 10.

In embodiments, MSS 100 further comprises secondary separation system 95. Optional secondary system (hereinafter OSS) 95 comprises at least one OSS inlet 91 and at least two OSS outlets. In the embodiment of FIG. 1, OSS 95 comprises OSS liquid product outlet 93 and OSS solids outlet 92. In embodiments, OSS inlet 91 is fluidly connected with MDSV liquid product outlet 59. In embodiments, OSS inlet 91 is fluidly connected with DS liquid product outlet 73. In embodiments, OSS 95 extracts small particles that may have escaped MDSV 60 with the overflow via MDSV liquid product stream 85. In embodiments, OSS 95 extracts small particles that exit DS 70 via DS liquid product stream 80. Secondary separation system 95 may be any system designed for smaller particle separation. In embodiments, secondary separation system 95 is capable of separating particles of less than 20 microns including sub-micron particles from a liquid stream. In embodiments, secondary separation system 95 comprises a cross-flow filtration unit. In embodiments, secondary separation system 95 comprises high gradient magnetic separation. In embodiments secondary separation system 95 comprises other filtration devices including, but not limited to, press filters, sand filters, centrifugal separators, hydro-cyclones (hydro-clones), and combinations thereof. The secondary separation system may comprise a multi-step separation system, as disclosed, for example, in U.S. Pat. Nos. 6,730,221 and 6,068,760.

Method

Another aspect of the present disclosure is a method for separating solid particles from a fluid stream comprising solid particles. In embodiments, the solid particles comprise magnetic catalyst particles. In specific embodiments, the disclosed method is suitable for the separation of solid magnetic catalyst particles from a catalyst slurry. In embodiments, the catalyst is a FT catalyst comprising at least one metal selected from iron and cobalt. In embodiments, the FT catalyst comprises a combination of iron and cobalt. In embodiments of the method, the catalyst comprises particles substantially in the range of from about 10 μm to about 200 μm. In some embodiments, the majority of the catalyst particles are within the range of from about 20 μm to about 150 μm. A minority of the catalyst particles may have a size of less than 10 microns or greater than 150 microns.

In embodiments, synthesis gas feedstream 20 is introduced into FT reactor 10, wherein the synthesis gas is converted into hydrocarbon products. FT vapor product 30 is removed from FT reactor 10 via reactor gas exit 31. FT vapor product 30 may be sent for further processing as known to those of skill in the art. In embodiments, effluent 40 is introduced to VLS 45, which may be any VLS known to those of skill in the art. In embodiments, the flow of effluent 40 from reactor 10 to VLS 45 is gravity assisted. In embodiments, the flow of effluent 40 from reactor 10 to VLS 45 is pump-assisted. Vapor is removed from VLS 45 via VLS vapor stream 50. VLS vapor stream 50 may be sent for further processing. For example, in the embodiment of FIG. 1, VLS vapor stream 50 is combined with FT vapor product stream 30 that exits FT reactor 10 via FT gas exit 31.

In embodiments comprising VLS 45, liquid exiting VLS 45 is introduced to MDSV 60, the dynamic settler with magnetic separation means. Upon introduction of slurry to MDSV 60, liquid product is separated from concentrated catalyst slurry. MDSV liquid product stream 85 comprises decreased solids content relative to the solids content of MDSV inlet stream 55. In embodiments, the MDSV concentrated slurry stream 65 comprises increased solids content relative to MDSV inlet stream 55.

In embodiments, the solids content of liquid product stream 85 is less than 5000 ppm. In embodiments, the solids content of liquid product stream 85 is less than 2500 ppm. In certain embodiments, the solids content of liquid product stream 85 is less than 1000 ppm.

In embodiments, the ratio of the volumetric flow rate of MDSV concentrated slurry stream 65 to the volumetric flow rate of liquid product stream 85 is in the range of from about 5 to about 30. In embodiments, the ratio of the volumetric flow rate of MDSV concentrated slurry stream 65 to the volumetric flow rate of liquid product stream 85 is in the range of from about 5 to about 20. In certain preferred embodiments, the ratio of the volumetric flow rate of MDSV concentrated slurry stream 65 to the volumetric flow rate of liquid product stream 85 is in the range of from about 10 to about 20.

In embodiments of the method, the liquid linear upward velocity of MDSV 60 is greater than or equal to 15 cm/h and the solids content of liquid product stream 85 is reduced to a value of less than about 5000 ppm. In some embodiments, the liquid linear upward velocity of MDSV 60 is greater than or equal to 45 cm/h and the solids content of liquid product stream 85 is less than about 5000 ppm. In embodiments, the liquid linear upward velocity of MDSV is greater than or equal to 90 cm/h and the solids content of liquid product stream 85 is less than about 5000 ppm.

In embodiments of the method, the liquid linear upward velocity of MDSV 60 is greater than or equal to 15 cm/h and the solids content of liquid product stream 85 is reduced to a value of less than about 2500 ppm. In some embodiments, the liquid linear upward velocity of MDSV 60 is greater than or equal to 45 cm/h and the solids content of liquid product stream 85 is less than about 2500 ppm. In embodiments, the liquid linear upward velocity of MDSV is greater than or equal to 90 cm/h and the solids content of liquid product stream 85 is less than about 2500 ppm.

In embodiments of the method, the liquid linear upward velocity of MDSV 60 is greater than or equal to 15 cm/h and the solids content of liquid product stream 85 is less than about 1000 ppm. In some embodiments, the liquid linear upward velocity of MDSV 60 is greater than or equal to 45 cm/h and the solids content of liquid product stream 85 is less than about 1000 ppm. In embodiments, the liquid linear upward velocity of MDSV is greater than or equal to 90 cm/h and the solids content of liquid product stream 85 is less than about 1000 ppm.

In embodiments, MDSV concentrated slurry 65 is recycled to reactor 10 via, for example, reactor slurry inlet 32. In some embodiments, MDSV concentrated slurry 65 undergoes further processing prior to recycle of catalyst to reactor 10. In the embodiment of FIG. 1, MDSV concentrated slurry stream 65 enters DS 70. Liquids removed from concentrated slurry stream 65 in DS 70 are removed from DS 70 via DS liquid product stream 80. DS liquid product stream 80 may, in some embodiments, contain particles below a certain size, the recycle of which to reactor 10 is undesired. In embodiments, DS liquid product stream 80 is combined with MDSV liquid product stream 85 from MDSV 60, yielding OSS inlet stream 90.

DS concentrated slurry stream 75 may be recycled to reactor 10 via FT reactor inlet 32. In embodiments, flow of slurry from MSS 100 to reactor 10 is gravity driven. In some embodiments, flow of slurry from MSS 100 to reactor 10 is pump-assisted. In embodiments, DS slurry exit stream 75 is further processed prior to recycle to reactor 10. For example, in embodiments, DS concentrated slurry stream 75 is treated to regenerate catalyst prior to recycle thereof to reactor 10 for reuse.

In embodiments, MDSV liquid product stream 85 from MDSV 60, having decreased solids content relative to MDSV inlet stream 55, is further processed prior to sale and/or use.

For example, in the embodiment of FIG. 1, MDSV liquid product stream 85 is sent to OSS 95. In embodiments, OSS inlet stream 90 comprises MDSV liquid product stream 85 combined with at least a portion of DS liquid product stream 80. Clarified liquid hydrocarbons product 120 comprising FT system 200 product is removed from MSS 100 and sent to further processing and/or distribution as known to those of skill in the art. OSS exit stream 110 comprising liquids and solids is removed from FT system 200 and disposed of as known to those of skill in the art.

In embodiments, MSS 100 is utilized in a CTL process (coal to liquids). In some embodiments, the MSS is utilized in a GTL (gas to liquids) process. In embodiments, MSS 100 is utilized in a bio-mass to liquids (BTL) process. MSS 100 may be utilized in a process combining any combination of CTL, GTL, and BTL processes.

While preferred embodiments of the invention have been shown and described, modifications thereof can be made by one skilled in the art without departing from the spirit and teachings of the invention. The embodiments described herein are exemplary only, and are not intended to be limiting. Many variations and modifications of the invention disclosed herein are possible and are within the scope of the invention. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, and so forth). Use of the term "optionally" with respect to any element of a claim is intended to mean that the subject element is required, or alternatively, is not required. Both alternatives are intended to be within the scope of the claim. Use of broader terms such as comprises, includes, having, etc. should be understood to provide support for narrower terms such as consisting of, consisting essentially of, comprised substantially of, and the like.

Accordingly, the scope of protection is not limited by the description set out above but is only limited by the claims which follow, that scope including all equivalents of the subject matter of the claims. Each and every claim is incorporated into the specification as an embodiment of the present invention. Thus, the claims are a further description and are an addition to the preferred embodiments of the present invention. The disclosures of all patents, patent applications, and publications cited herein are hereby incorporated by reference, to the extent they provide exemplary, procedural or other details supplementary to those set forth herein.

What is claimed is:

1. A method for separating solid particles from a fluid stream having an inlet solids content, the method comprising:
   introducing the fluid stream into a magnetic dynamic settler vessel comprising at least one magnetic field therein, at least one fluid inlet for introduction of the fluid stream having the inlet solids content, at least one exit for a liquid product stream comprising a solids content less than the inlet solids content, at least one exit for a fluid stream comprising a solids content greater than the inlet solids content, and a vertical feed conduit extending at least 70% of the distance from the at least one fluid inlet to the at least one exit for a fluid stream comprising a solids content greater than the inlet solids content, wherein the vertical feed conduit is at one side of the magnetic dynamic settler vessel, wherein the magnetic dynamic settler vessel comprises no substantially magnetized interior physical component, and wherein the at least one magnetic field is directed such that the solids agglomerate substantially vertically;
   removing from the magnetic dynamic settler vessel at least one liquid product stream comprising a solids content less than the inlet solids content; and
   continuously removing from the magnetic dynamic settler vessel at least one stream comprising a solids content greater than the inlet solids content.

2. A method for separating solid particles from a fluid stream having an inlet solids content, the method comprising:
   introducing the fluid stream into a magnetic dynamic settler vessel comprising a single interior void volume, the magnetic dynamic settler vessel comprising at least one magnetic field therein, at least one fluid inlet for introduction of the fluid stream having the inlet solids content, at least one exit for a liquid product stream comprising a solids content less than the inlet solids content, at least one exit for a fluid stream comprising a solids content greater than the inlet solids content and a vertical feed conduit extending at least 70% of the distance from the at least one fluid inlet to the at least one exit for a fluid stream comprising a solids content greater than the inlet solids content, wherein the vertical feed conduit is configured to introduce the fluid stream having the inlet solids content into the single interior void volume and is at one side of the magnetic dynamic settler vessel, wherein the magnetic dynamic settler vessel comprises no substantially magnetized interior physical component, and wherein the at least one magnetic field directed such that the solids agglomerate substantially vertically;
   removing from the magnetic dynamic settler vessel at least one liquid product stream comprising a solids content less than the inlet solids content; and
   continuously removing from the magnetic dynamic settler vessel at least one stream comprising a solids content greater than the inlet solids content.

3. The method of claim 2 wherein the inlet solids content is greater than 5000 ppm by weight.

4. The method of claim 2 wherein the at least one liquid product stream comprising a solids content less than the inlet solids content comprises a solids content less than 2500 ppm by weight.

5. The method of claim 2 wherein the at least one liquid product stream comprising a solids content less than the inlet solids content comprises a solids content less than 1000 ppm by weight.

6. The method of claim 2 wherein the magnetic dynamic settler vessel has a liquid linear upward velocity of greater than 90 cm/h.

7. The method of claim 2 wherein the solid particles comprise Fischer-Tropsch catalyst particles.

8. The method of claim 2 further comprising introducing the stream comprising a solids content greater than the inlet solids content into a second dynamic settler.

9. The method of claim 8 further comprising removing from the second dynamic settler at least one secondary dynamic settler concentrated slurry stream and at least one secondary dynamic settler liquid product stream.

10. The method of claim 9 further comprising introducing the at least one secondary dynamic settler concentrated slurry stream into a Fischer-Tropsch reactor.

11. The method of claim 9 further comprising introducing the liquid product stream comprising a solids content less than the inlet solids content and the at least one secondary dynamic settler liquid product stream into a secondary separation system.

12. The method of claim 2 wherein the fluid stream having the inlet solids content comprises effluent removed from a multi-phase catalytic reactor, said effluent comprising solid magnetic catalyst particles.

13. The method of claim 12 wherein the multi-phase catalytic reactor comprises a Fischer-Tropsch reactor.

14. The method of claim 2 further comprising introducing the at least one stream comprising a solids content greater than the inlet solids content to a Fischer-Tropsch reactor.

15. A method for separating solid particles from a fluid stream having an inlet solids content, the method comprising:

introducing the fluid stream into a magnetic dynamic settler vessel comprising a single interior void volume, the magnetic dynamic settler vessel comprising at least one magnetic field therein, at least one fluid inlet for introduction of the fluid stream having the inlet solids content, at least one exit for a liquid product stream comprising a solids content less than the inlet solids content, at least one exit for a fluid stream comprising a solids content greater than the inlet solids content, and a vertical feed conduit extending at least 70% of the distance from the at least one fluid inlet to the at least one exit for a fluid stream comprising a solids content greater than the inlet solids content, wherein the vertical feed conduit is configured to introduce the fluid stream having the inlet solids content into the single interior void volume, wherein the magnetic dynamic settler vessel comprises no other interior physical component, and wherein the at least one magnetic field is directed such that the solids agglomerate substantially vertically;

removing from the magnetic dynamic settler vessel at least one liquid product stream comprising a solids content less than the inlet solids content; and continuously removing from the magnetic dynamic settler vessel at least one stream comprising a solids content greater than the inlet solids content.

\* \* \* \* \*